United States Patent

Josephs

Patent Number: 5,377,571
Date of Patent: Jan. 3, 1995

[54] SAFETY GUARD SYSTEM FOR BAND SAWS AND SIMILAR EQUIPMENT

[76] Inventor: Harold Josephs, 25311 Ronald Ct., Oak Park, Mich. 48237

[21] Appl. No.: 138,799

[22] Filed: Oct. 19, 1993

[51] Int. Cl.⁶ .................................... B27G 19/06
[52] U.S. Cl. ............................. 83/399; 83/440.2; 83/447; 83/544; 83/814; 83/DIG. 1
[58] Field of Search ............... 83/63, 372, 440.2, 443, 83/446, 447, 450, 478, 544, 814, 820, DIG. 1, 67, 860, 399

[56] References Cited

U.S. PATENT DOCUMENTS

| | | | |
|---|---|---|---|
| D. 301,719 | 6/1989 | Wodli | D15/134 |
| 1,258,695 | 3/1918 | Miller et al. | 83/814 |
| 1,329,708 | 2/1920 | Heath et al. | 83/440.2 |
| 1,632,258 | 6/1927 | Wilson | 83/544 X |
| 2,371,731 | 3/1945 | Boice et al. | 83/814 |
| 2,538,456 | 1/1951 | Howe, Jr. | 83/814 |
| 2,721,587 | 10/1955 | Dremel | 83/544 X |
| 3,159,196 | 12/1964 | Engi | 83/399 |
| 3,830,131 | 8/1974 | Wells | 83/820 |
| 3,848,502 | 11/1974 | O'Neill | 83/814 |
| 3,875,839 | 4/1975 | Aizawa | 83/360 |
| 3,884,101 | 5/1975 | Silkin | 83/544 |
| 3,888,148 | 6/1975 | Weissman | 83/100 |
| 3,939,749 | 2/1976 | Muller et al. | 83/814 |
| 3,974,724 | 8/1976 | Shadle | 83/68 |
| 4,096,789 | 6/1978 | Blessinger | 83/478 |
| 4,204,444 | 5/1980 | Kohr | 83/56 |
| 4,685,364 | 8/1987 | Scheflow et al. | 83/399 X |
| 4,960,026 | 10/1990 | Terpstra | 83/818 |

OTHER PUBLICATIONS

Advertisement for various power tools, p. 52, publication unknown, publication date unknown.

*Primary Examiner*—Richard K. Seidel
*Assistant Examiner*—Raymond D. Wood
*Attorney, Agent, or Firm*—Brooks & Kushman

[57] ABSTRACT

A safety guard system for a band saw that comprises a flexible member and a sensor for deactivating the band saw when the flexible member is not deployed correctly. The flexible member has a resting position and a sawing position. In both positions, the flexible member provides a protective barrier between the band saw user and the band saw blade. The flexible member automatically adjusts by flexing to accommodate different sized work pieces.

15 Claims, 2 Drawing Sheets

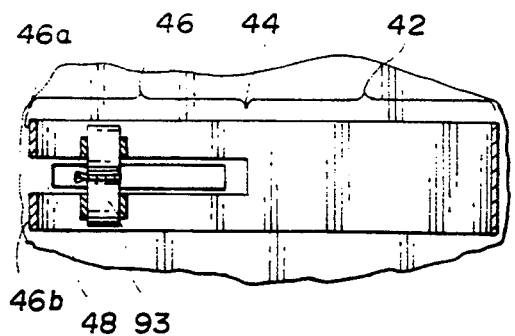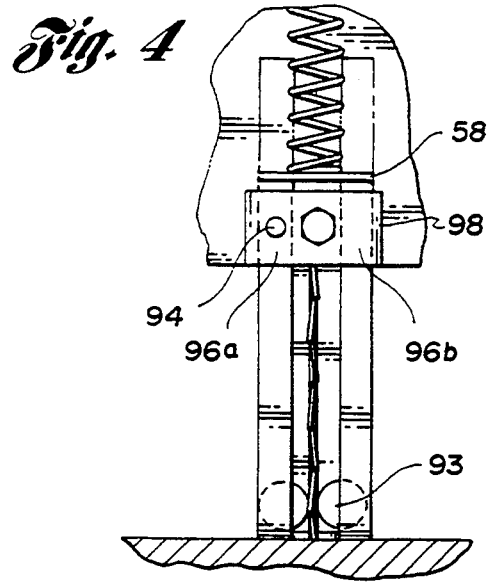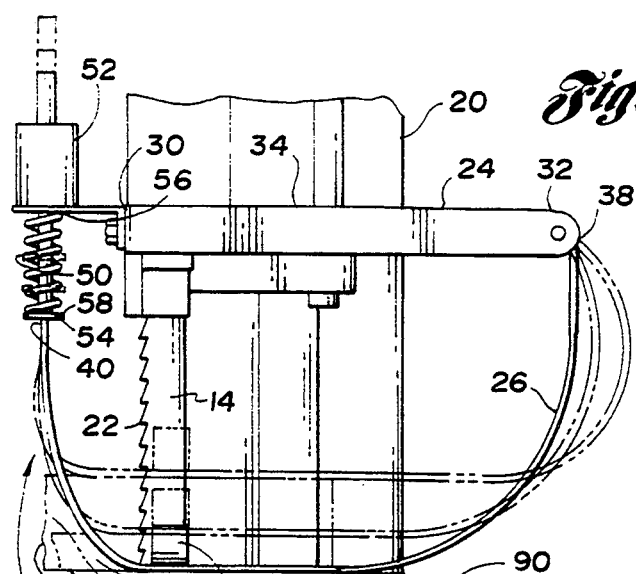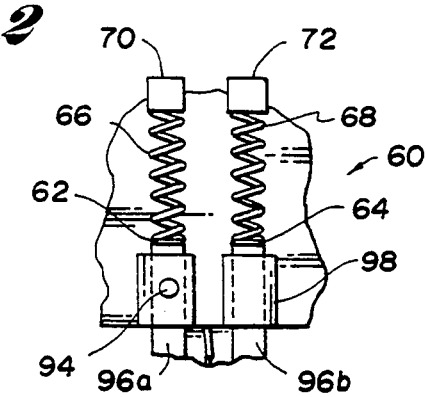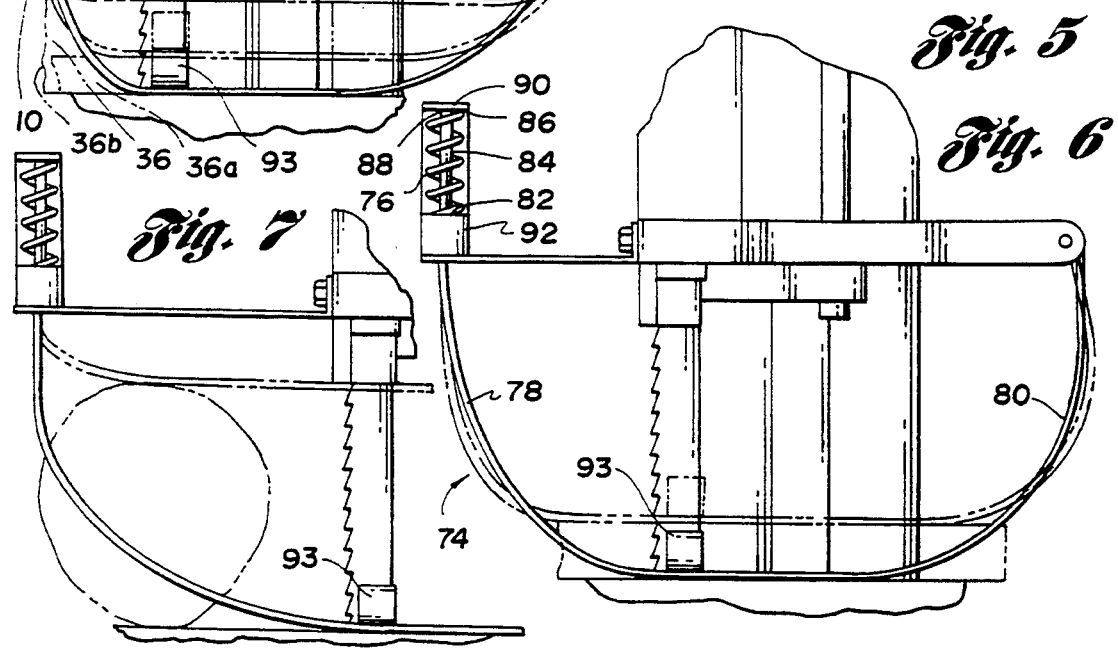

SAFETY GUARD SYSTEM FOR BAND SAWS AND SIMILAR EQUIPMENT

TECHNICAL FIELD

The invention relates generally to safety systems and devices. In particular, the invention relates to a safety guard system for band saws or other similarly dangerous cutting machines.

BACKGROUND ART

Band saws are extremely dangerous machines. With even the slightest momentary inadvertent movement, the operator of a band saw may face serious and debilitating injury. The potential for this human suffering and serious personal injury arises from the fact that a band saw is always operated with a portion of the blade's sawing length unguarded in order to cut workpieces. Moreover, the nature of a band saw is such that the operator necessarily places his arms, hands and fingers precariously close to the unguarded band saw teeth.

The teeth of a band saw usually face the operator. The operator cuts a workpiece by placing it between himself and the teeth, and sliding the workpiece toward and through the teeth until the workpiece has been completely cut. In order to accommodate large workpieces, the band saw must be able to have a large number of teeth exposed. When the saw is being used to cut small workpieces, however, it is desirable for the operator's safety to have only a limited length of blade exposed. Indeed, whatever the size of the workpiece being cut, it is desirable to have a minimal length of blade exposed, i.e. only the length of blade necessary to cut the entire workpiece.

Most band saw blade guards in the prior art are adjustable, in that they allow the operator to reduce the amount of blade exposed to only that necessary to accommodate the workpiece being cut.

This active, operator dependent adjustment, however, depends upon the skill, training, competence and concentration of the operator. Thus, if the operator is rushed, tired, or has a foreseeable lapse of concentration, he may not adjust the blade guard to minimize the exposed area or in attempting to adjust the guard, he may not properly complete this task. The operator may cut a small workpiece on a band saw while a large length of blade is exposed, particularly given the pressures of production or the stresses of a job shop environment.

The band saw teeth, designed to cut through wood, steel and other materials, can similarly cut human body parts. Only the slightest momentary contact with a limb or body part is necessary to cause serious and permanent injury, because the unidirectional cutting nature of the band saw can operate to pull an object into the cutting path with even the slightest contact. Furthermore, if an unfortunate operator should mistakenly allow his gloved hand or sleeve to contact the band saw blade, his hand or wrist will inevitably follow.

The foreseeable dangers inherent in the operation of any band saw compel the use of a safety guard, or some other form of safety system for the band saw during operation, in order to protect the operator.

The nature of the dangers of a band saw further require that a safety guard or safety system be fail-safe and "passive", or "fool-proof", if possible. To be fully effective, the safety system must operate automatically and passively, without the need for operator intervention or adjustment. Moreover, the safety system must be such that the band saw operation is precluded without the safety system being in place.

Many band saw operators are untrained and unsophisticated with respect to safety matters and the significant and foreseeable risks of harm attendant to the exposed band saw blade. Safety instructions, although often provided with band saws, are not sufficient to protect band saw operators if the hazards can be properly guarded. Typically, safety instructions and/or warnings are provided with a band saw wherein the user is instructed to adjust the upper blade guard in a downward direction until a minimum clearance is provided between the bottom of the upper blade guard and the top of the object being cut. The band saw operator is then requested to lock in place, generally by a cam actuated handle, the upper blade guard in its preferred/desired location. Such safety instructions place a continuing, on-going burden upon all band saw operators to constantly manually adjust the band saw upper blade guard to minimize the amount of exposed blade and danger zone, when cutting different thicknesses of material. The efficacy of implementing a safe product through such safety instructions and/or warnings is foreseeably inadequate when a competent mechanical guarding system can be implemented. The consequence of relying solely upon such instructions and/or warnings, is foreseeable and inevitable injuries given the reality of human factors.

Thus, while the manually operated blade guard may be sufficient for some operators and in some circumstances, it is also foreseeably insufficient in others. However, to be effective, a guarding system cannot be arbitrary and operate only for selected circumstances, but it must safeguard all foreseeable users as well as safeguard against all foreseeable uses and misuses of the band saw wherever possible.

The foreseeable and significant hazards associated with operation of such a band saw are numerous. For example, if an operator utilizes the band saw with an exposed area larger than the workpiece, the blade will be exposed to his arms, face and hands as he or she pushes the workpiece past the blade.

Heretofore, because of the design of the equipment, the dangers of the exposed blade could only be cured by the operator. Even though injuries were foreseeable, band saw manufacturers did not ensure that the operators would always utilize the band saws leaving the proper allowable distance of exposed band saw blades. In industrial operations, it is foreseeable that there may be multiple users of band saws. The blade guard adjustment set by a previous operator may be maintained by a subsequent operator even if that previous operator were cutting larger workpieces. It is foreseeable that with a large blade exposure while pushing small workpieces past the blade, the operator's hands or fingers may inadvertently slip into the danger zone, i.e. the exposed blade zone, and to the teeth of the rapidly moving blade.

In addition, with the upper blade guard in a raised position, the guide rollers attached to this lower blade guard will be at an extended location from the workpieces. This will permit increased workpiece vibration, and lateral and rotational motion of the blade resulting in decreased sawing efficiency. This decreased sawing efficiency may cause the operator to grasp the workpiece closer to the blade and to push the workpiece into the blade with greater force. The closer proximity of the worker's hand to the moving blade and/or increasing the force applied to the workpiece in crease the hazards of the band sawing operation.

Finally, it may often happen that many operators of the band saw either lack training, or lack understanding, of the safe and proper way to operate the hazardous band saw. They may also be unaware of the potential dangers and therefore be unlikely to seek assistance in the band saw operation. This is particularly true since many users may be lulled into a false sense of security by the deceptively benign or harmless appearance of a band saw in operation.

DISCLOSURE OF INVENTION

Accordingly, it is an object of this invention to provide a band saw guard system that is effective to guard the blade with materials of different thicknesses and different types.

It is a further object of this invention to provide a band saw guard system that will effectively guard all "non-cutting" portions of the blade independent of the thickness of the material being cut.

It is a further object of this invention to provide a band saw blade guarding system that always maintains contact with the workpieces being cut, thereby generating a positive biasing force with which to stabilize the workpiece and maintain the workpiece against the work table.

It is still another object of this invention to provide a band saw blade guard system that can be used to cut workpieces as large as the fully exposed length of the band saw blade.

It is yet another object of this invention to provide a band saw blade guard system that is capable of easily being used as an aftermarket attachment to existing band saws.

It is another object of this invention to provide a band saw blade guard system that automatically renders the band saw inoperable if the guard system is not in place, by means of an interlock.

It is another object of this invention to provide a band saw blade guard system that is fail-safe, such that the dual interlock system, if inoperable even in part, will cause the band saw to not operate.

It is a final object of this invention to provide a band saw blade guard system, at a reasonable cost, that will properly function under foreseeable conditions to be found in a common industrial environment, which may include heat, dust, dirt, grit, vibrations and/or shock.

BRIEF DESCRIPTION OF THE DRAWINGS

FIG. 2 is a side view of the preferred embodiment of the safety guard system of the present invention;

FIG. 3 is a view along line 3—3 of FIG. 1, of the safety guard system of the present invention;

FIG. 4 is a front view along line 4—4 of FIG. 1, of the safety guard system of the present invention;

FIG. 5 is a front view of an alternative embodiment of the safety guard system of the present invention;

FIGS. 6 and 7 are side views of an alternative embodiment of the safety guard system of the present invention.

BEST MODES FOR CARRYING OUT THE INVENTION

Figure 1:
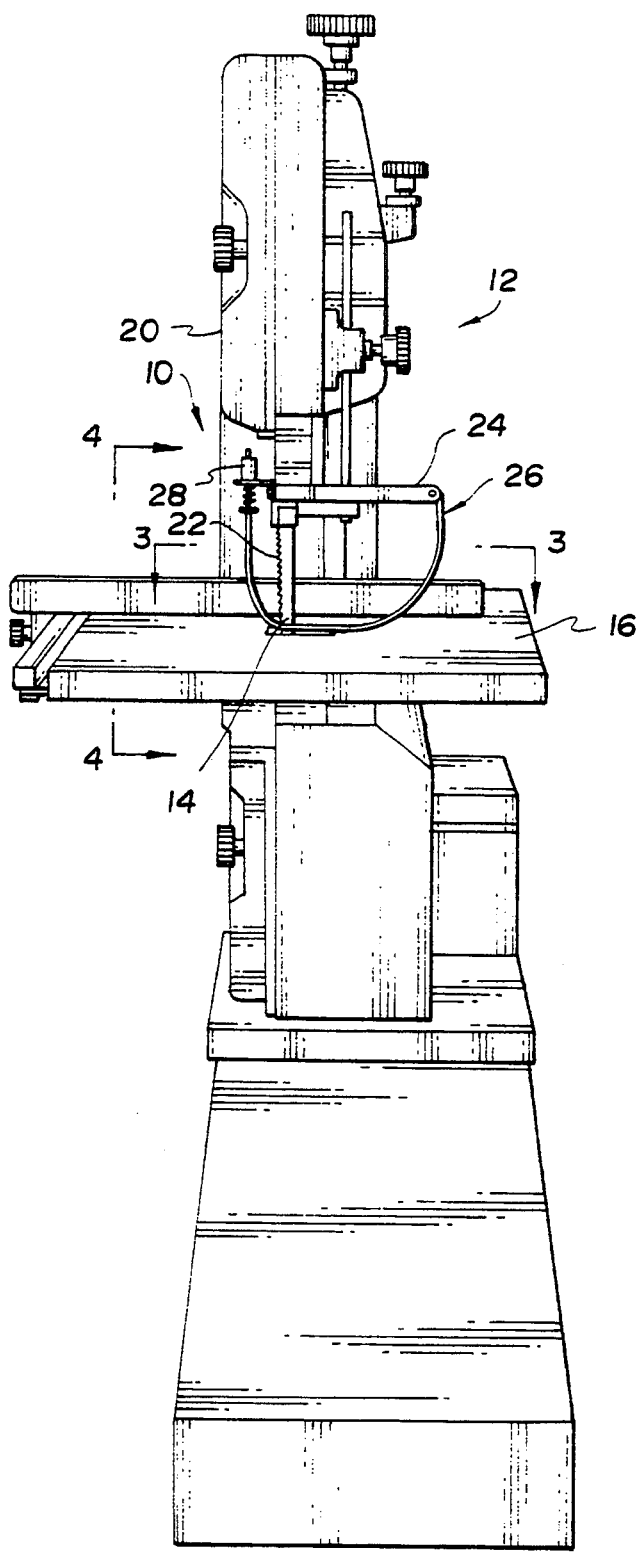
FIG. 1 is a perspective view of a band saw on which the safety guard system of the invention may be used.

The present invention relates to a safety guard system 10 for band saws 12. The band saws 12 for which the safety guard system may be adapted, by retro fitting or by initial design, are common in the industry and in home shops, and are used for cutting various materials of different shapes and thickness. These saws are therefore referred to as general purpose machines.

The band saw 12 operates with the use of a single looped blade 14 drawn over two large pulleys (not shown) and guided through a number of guide rollers (not shown) for blade stability. Typically a pair of guide rollers (the upper pair) are found on the lower portion of an extensible arm (not shown). This extensible arm surrounds the blade and is often referred to as the upper blade guard.

Referring to FIG. 1, the safety guard system 10 of the present invention is adapted for use with a band saw 12. The band saw includes a band saw blade 14, a cutting platform 16, and an upper housing 20. The band saw blade 14 has a cutting edge 22. The particular band saw of FIG. 1 is displayed mainly for the purposes of illustration, and is not meant to limit the present invention in any way. In addition, for the sake of economy, the band saw safety guard system of the present invention will be referred to hereinafter as the safety guard 10.

Referring to FIG. 2, the safety guard 10 comprises a fixture 24, a flexible member 26, and a sensor 28. In the preferred embodiment, the fixture 24 has a first end 30 and a second end 32. The first end 30 attaches to the band saw housing 20. For additional stability, the fixture may also be attached along its length, such as at 34.

The fixture 24 is adapted so that it may be attached to a variety of band saw housings 20. The fixture 24 may be designed for attachment to the band saw housing 20 when the band saw 12 is built, or it may be designed for after market use, i.e. for attachment to existing band saws. The fixture 24 may be made of steel or any other rigid structure of material.

The flexible member 26 may also be made of steel. Unlike the fixture 24, however, the flexible member 26 is not rigid. As can be seen in FIG. 2, the flexible member ms sufficiently flexible to contact the cutting platform 16 when it is in its at rest position, i.e., when the band saw 12 is not cutting a workpiece 36, and also when it is in its cutting position, i.e. when the band saw 12 is cutting a small workpiece 36a or a large workpiece 36b.

The flexible member 26 of the preferred embodiment has a first end 38 and a second end 40. The first end 38 is attached to the fixture at the second end 32 of the fixture 24. When the band saw is not cutting a workpiece 36, the flexible member 26 extends from the first end 38 down to the cutting platform 16 and along the cutting platform 16 past the band saw blade 14 and then to the sensor 28. In the preferred embodiment, the flexible member 26 thus forms a partial loop.

As will be more fully described, the second end 40 of the flexible member 26 communicates with the sensor 28.

Referring to FIG. 3, the flexible member 26 has two portions. The first portion 42 is a single band of flexible steel. At 44 the flexible member 26 splits, or forks, and the second portion 46 begins. The second portion has two prongs 46a and 46b, with a slot 48 therebetween. The band saw blade 14 passes through the slot 48 between the two prongs 46a and 46b. The slot 48 and the two prongs 46a and 46b permit the insertion and adjustment of the band saw blade 14. Referring to FIG. 2, the slot 48 allows the second portion 46 of the flexible member 26 to form a barrier between a user (not shown) and the blade 14. In an alternative embodiment, the entire flexible member may comprise two prongs.

The second portion 46 extends from the split at 44 up to the sensor 28. The sensor 28 may comprise a variety of structures and may be arranged in a variety of ways. The objective of the sensor 28, however, is to detect the presence of the flexible member 26, and to disable the band saw 12 when the flexible member 26 is not in place and properly adjusted.

Referring to FIG. 2, the sensor 28 comprises a compression spring 50 and a spring activated micro switch 52. The spring 50 has a first end 54 and a second end 56. The second end 40 of the flexible member 26 is in contact with the first end 54 of the spring 48. The second end 56 of the spring 50 is in contact with the microswitch 52, through an end plate 58. The microswitch 52 is normally open. When the flexible member is in place, however, the spring 50 is compressed, and the microswitch 52 closed by the biasing force of the compressed spring. The power circuit for the band saw can be passed through the microswitch 52 so that the band saw is inoperable when the microswitch 52 is open. When the flexible member 26 is not in place, the spring 50 is not in compression, and the microswitch 52 is open, thereby rendering the band saw inoperable.

The safety guard 10 can accommodate both large and small workpieces. Referring to FIG. 4 a small workpiece 36a may be slid past the band saw blade 14 under the flexible member 26. The flexible member 26 deflects upwardly as the band saw operator slides the workpiece 36a past the band saw blade 14 and the band saw blade 14 cuts the workpiece 36a. Similarly, the safety guard 10 can also accommodate a large workpiece 36b. A large workpiece 36b causes a larger deflection in the flexible member 26. In all instances, however, one of the prongs 46a or 46b of the flexible member 26 remains between the operator and the cutting edge 22 of the blade 14.

It may be found desirable or necessary to provide for a larger "entrance angle" of the guard such as when cutting large, irregularly shaped items such as pieces of meat. In such cases, the "entrance angle" of the guard to the blade can be enlarged by extending outward the rigid horizontal arm 34 of fixture 24 as shown in FIGS. 6 and 7.

Referring to FIG. 5, an alternative embodiment of the safety guard 60 is shown which comprises two end plates 62 and 64, each of which engages separate springs 66 and 68, respectively. The two springs communicate with one or two microswitches 70 and 72. An advantage of this embodiment is that the two end plates 62 and 64 and two springs 66 and 68 allow the band saw blade to be changed without needing to remove the safety guard.

Incorporation of two microswitches 70 and 72 into the alternative embodiment of the safety guard 10 renders the safety guard even more "fail-safe" then when the safety guard 10 has just one microswitch 52. In particular, the guard can reliably function even when one of the microswitches 70 and 72 is inoperable or, alternatively, the microswitches can be oriented in a circuit so that the band saw 12 is rendered inoperable if either of the microswitches is inoperable. The circuit can be designed so that if both microswitches are inoperable, the band saw itself will become inoperable.

Referring to FIG. 6, another alternative embodiment of the safety guard 74 may comprise a spring 76 that operates in tension rather than compression. In the alternative embodiment, the second portion 78, the flexible member 80 does not terminate at the first end 82 of the spring 76. Rather, the two prongs of the flexible member 80 extend along the axis 84 of the spring 76 to the second end 86 of the spring 76. The second end 86 of the flexible member 80 is attached to an end plate 90 which is attached to the second end 88 of the spring 76. The first end 82 of the spring 76 is attached to a microswitch 92. When the safety guard 74 is in place, the flexible member 80 pushes up through the spring 76 and places the spring 76 in tension. The microswitch 92 is connected to the power circuit of the band saw in such a way that the power supply to the band saw is interrupted unless the spring 76 is in tension.

The alternative embodiment shown in FIG. 6 may also incorporate two springs and two plates as illustrated in FIG. 5.

An alternative embodiment would be to include a pair of guide rollers 93 into the lower horizontal portion of the guard flexible member as illustrated in FIGS. 2, 4, 6 and 7.

In other alternative embodiments, the sensor 28 may be something other than a spring activated microswitch 52 and 92. For example, referring to FIGS. 4 and 5, the sensor 28 may be an optical sensor 94. The second portion 96a and 96b of the flexible member 26 passes through a guide 98. In the guide 98, optical sensor 99 detects the presence of the second portion 96a and 96b of the flexible member 26. When the flexible member 26 is not in place, the optical sensor 94 will detect its absence, and interrupt power supply to the band saw.

The safety guard 10 may be used on both vertical band saws or horizontal band saws. As the safety guard 10 does not rely on gravity, but on the biasing force of the flexible member 26, it is equally adaptable to both types of band saws.

Having thus described the present invention, many modifications thereto will become apparent to those skilled in the art to which it pertains without departing from the scope and spirit of the present invention as defined in the appended claims.

What is claimed is:

1. A guard for a power saw used to cut a workpiece, the power saw having a blade which is driven by a motor having a power circuit, the blade being enclosed by a housing covering all but a cutting area portion of the blade, a workpiece support platform disposed at one end of the cutting area portion, the guard comprising:

a flexible member having a first end, a middle portion, and a second end, each of said ends being secured to the housing, said flexible member having an at-rest position in which the middle portion of the flexible member extends across the cutting area portion forming a partial-loop, and contacts the workpiece support platform wherein the middle portion of the flexible member normally covers the cutting area portion and a sawing position in which the workpiece is placed on the workpiece support platform with the flexible member being deformed from the at-rest position of the flexible member, and extending from the housing across a first segment of the cutting area portion between the workpiece placed on the workpiece support platform and the housing wherein the workpiece and the flexible member cooperate to cover the cutting area portion as the workpiece is cut; and a switch in the power circuit, said switch being closed by the flexible member containing the workpiece support platform and by the flexible member contacting the workpiece on the workpiece support platform.

2. The guard in accordance with claim 1 wherein the flexible member is formed of a resilient material having spring-like characteristics so that when the flexible member undergoes deformation due to the placement of the workpiece on the workpiece support platform, the flexible member provides a reaction force on the workpiece support platform and on the workpiece.

3. A guard for a band saw used to cut a workpiece, the band saw having a continuous loop blade which is driven by a motor having a power circuit, the blade being enclosed by a housing covering all but a cutting area portion of the blade, a workpiece support platform disposed at one end of the cutting area portion, the guard comprising:

a flexible member secured to the housing, said flexible member having an at-rest position in which the flexible member extends from the housing across the cutting area portion and contacts the workpiece support platform wherein the flexible member normally covers the cutting area portion and a sawing position in which the workpiece is placed on the workpiece support platform with the flexible member being deformed from the at-rest position of the flexible member, and extending from the housing across a first segment of the cutting area portion between the workpiece placed on the workpiece support platform and the housing wherein the workpiece and the flexible member cooperate to cover the cutting area portion as the work piece is cut, and wherein the flexible member provides a reaction force on the workpiece support platform and the workpiece; and a switch in the power circuit, said switch being closed by the reaction force on the workpiece support platform and the workpiece.

4. The guard in accordance with claim 3 wherein the reaction force closes the switch and the power circuit through the use of a compression spring.

5. The guard in accordance with claim 3 wherein the reaction force closes the switch and the power circuit through the use of a spring.

6. The guard in accordance with claim 3 wherein the flexible member is a metal band.

7. The guard in accordance with claim 3 wherein the flexible member forms a partial loop, with spring-like characteristics.

8. The guard in accordance with claim 3 wherein the flexible member is formed of a resilient material having spring-like characteristics so that when the flexible member undergoes deformation due to the placement of the workpiece on the workpiece support platform, the flexible member provides a biasing force on the workpiece to help maintain the workpiece against the workpiece support platform.

9. The guard in accordance with claim 3 further comprising a fixture attached to the housing which interconnects the flexible member with the housing.

10. The guard in accordance with claim 3 wherein the flexible member has a forked end having two prongs and the blade extends between the two prongs.

11. A safety system for protecting a user of a saw having a saw blade and a workpiece support platform, the safety system comprising:

a flexible member attached to the saw, the flexible member having an opening through which the saw blade extends, the flexible member having a portion forming a protective barrier between the user of the saw and the saw blade, the flexible member being deformable to simultaneously accommodate a workpiece on the workpiece support platform and maintain the protective barrier between the user and the blade; and a sensing device operatively coupled to the flexible member such that the sensing device enables operation of the saw when the flexible member is attached to the saw and in contact with the workpiece support platform, and when the flexible member is attached to the saw and in contact with the workpiece; and the sensing device operatively coupled to the flexible member such that the sensing device generates an output signal when the flexible member becomes detached from the saw; and means for receiving the output signal and disabling the operation of the saw in response to the output signal.

12. The safety system in accordance with claim 11 further comprising a compression spring, the sensing device detecting whether the flexible member is attached to the saw by sensing compression of the spring.

13. The safety system in accordance with claim 11 wherein said receiving means causes the saw to be inoperable when the sensing device malfunctions.

14. A safety system for protecting a user of a saw having a saw blade and a workpiece support platform, the safety system comprising:

a flexible member attached to the saw, the flexible member having an opening through which the saw blade extends, the flexible member having a portion forming a protective barrier between the user of the saw and the saw blade, the flexible member being deformable to simultaneously accommodate a workpiece on the workpiece support platform and maintain the protective barrier between the user and the blade; and a sensing device operatively coupled to the flexible member, the sensing device communicating with a power circuit for the saw and said power circuit containing a switch having an opened and a closed position wherein the saw is operable when the switch is in the closed position and inoperable when the switch is in the opened position, the sensing device causing the switch to be closed when the flexible member is attached to the saw and in contact with the workpiece support platform, and when the flexible member is attached to the saw and in contact with the workpiece; and the sensing device causing the switch to be opened when the flexible member becomes detached from the saw.

15. The safety system in accordance with claim 14 wherein malfunctioning of the sensing device causes the switch to be opened.

* * * * *